Jan. 11, 1944.     C. G. STRANDLUND     2,339,225

PLOW

Filed Dec. 4, 1940     5 Sheets-Sheet 1

INVENTOR:
CARL G. STRANDLUND
BY
ATTORNEYS.

Jan. 11, 1944.  C. G. STRANDLUND  2,339,225
PLOW
Filed Dec. 4, 1940   5 Sheets-Sheet 2

INVENTOR:
CARL G. STRANDLUND
BY
ATTORNEYS.

Jan. 11, 1944.   C. G. STRANDLUND   2,339,225
PLOW
Filed Dec. 4, 1940   5 Sheets-Sheet 3

INVENTOR:
CARL G. STRANDLUND
BY
ATTORNEYS.

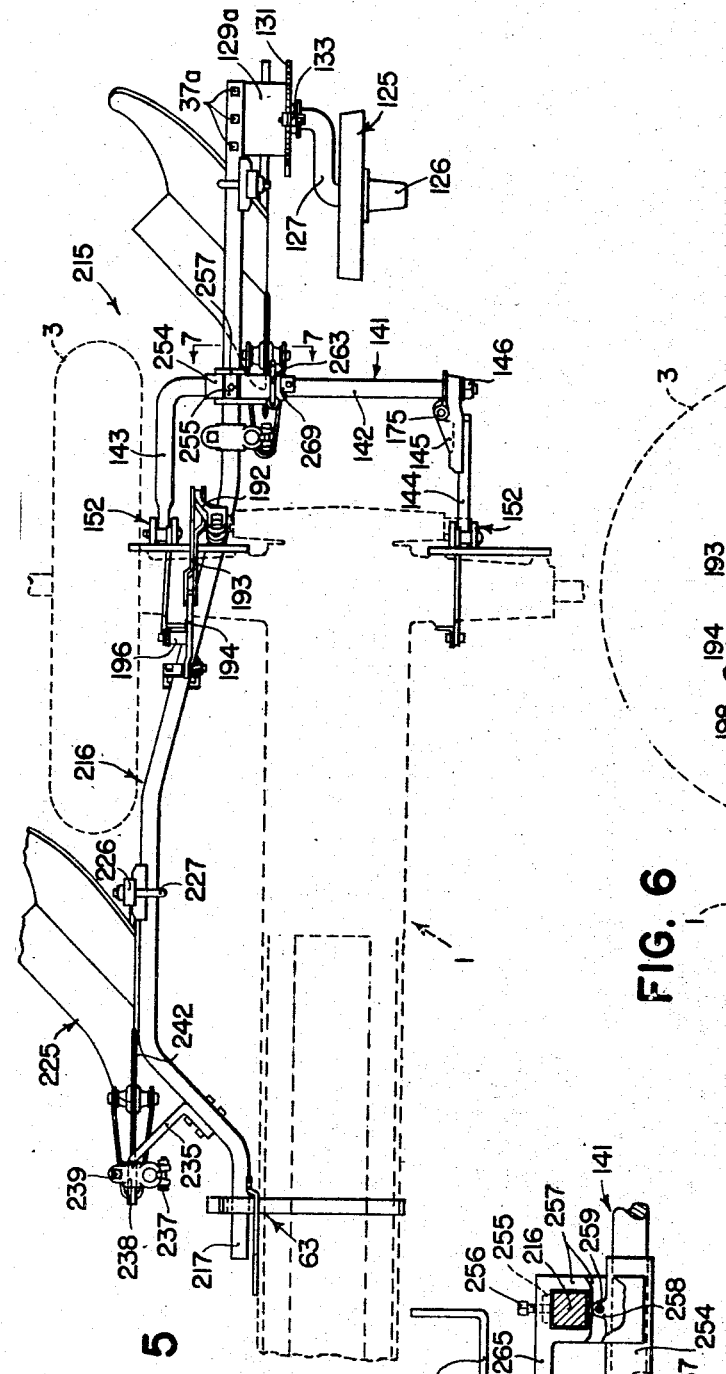

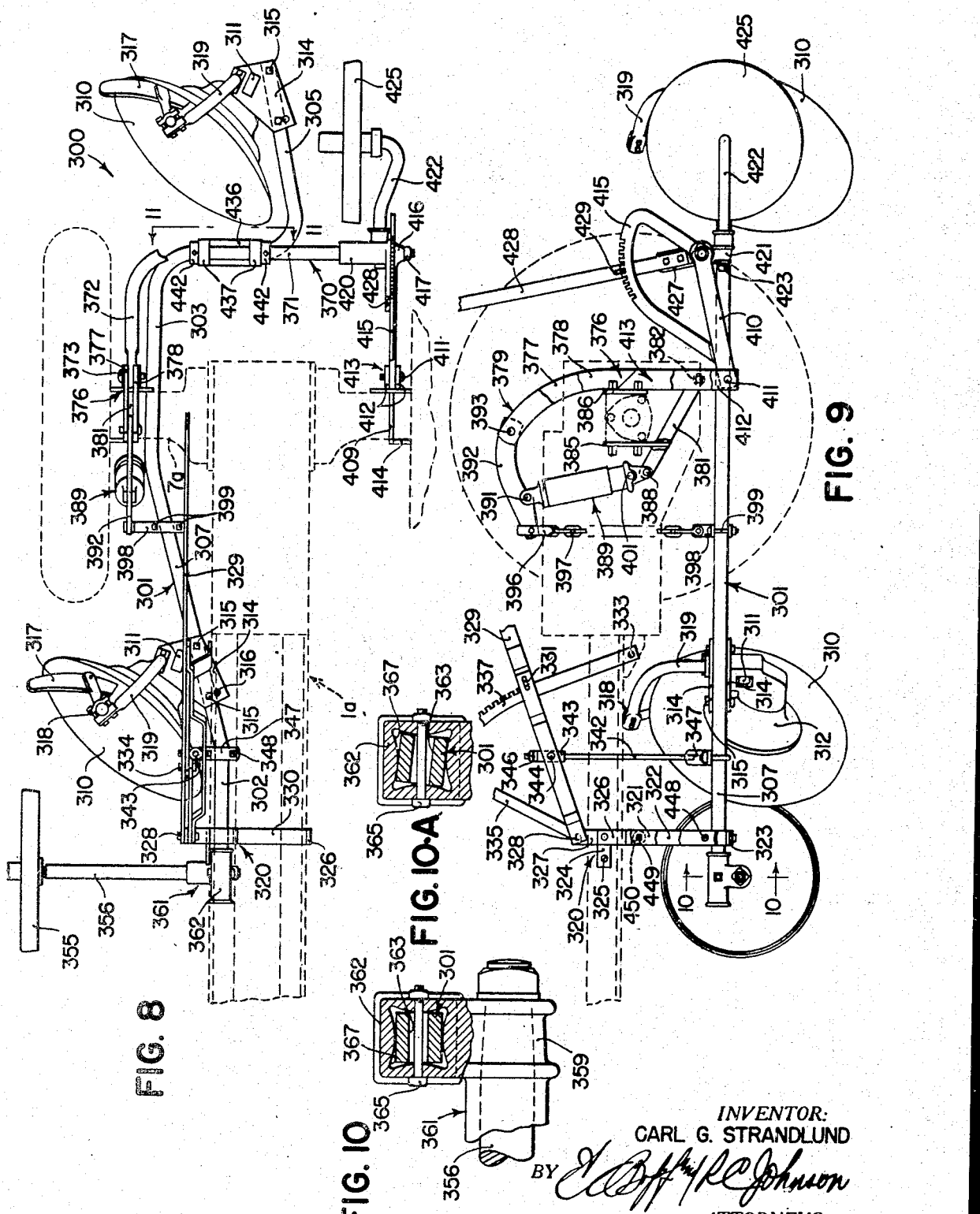

Patented Jan. 11, 1944

2,339,225

UNITED STATES PATENT OFFICE 2,339,225

PLOW

Carl G. Strandlund, Moline, Ill., assignor to Deere & Company, Moline, Ill., a corporation of Illinois Application December 4, 1940, Serial No. 368,471

41 Claims. (Cl. 97—47)

This invention relates generally to agricultural implements and more particularly to tractor-mounted plows, in which the tractor itself serves as the supporting frame of the plow.

The object and general nature of this invention is the provision of an integral mounted plow having two furrow openers and especially adapted for use in small fields, close to fences and the like, and at other places where easy maneuverability and short turns are required.

Another feature of this invention is the provision of a mounted plow in which the front furrow opener is disposed in front of the rear wheels of the tractor and the rear furrow opener is disposed rearwardly of the rear wheels. In this connection it is also a feature of this invention to so mount the plow bodies and the tool beam to which they are connected so that all side thrust is taken by the tractor itself. Also, it is a feature of this invention to mount the furrow openers so that the thrust reaction is imposed, longitudinally of the tractor, substantially at the rear axle. By virtue of this relation, the side thrust is imposed on the tractor at a point where the vertical wheel loading is substantially the greatest and also at a point where steering will not be affected. However, in this connection, it is a further feature of the present invention to mount the plow on the tractor and connect the same thereto so that the front wheel loading will be increased, thereby increasing the steering effectiveness of the tractor.

Another important feature of the present invention is the provision of a mounted plow of the integral type employing two disk furrow openers, one mounted in front of the rear tractor wheels and the other mounted rearwardly thereof. It is also a feature of this invention to provide draft connections between the tractor and the tool beam supporting the two disks so that there is a component of the draft pull tending to force the disks into the ground and to maintain them in their working position. It is a further feature of this invention to provide draft connections by which the draft pull is applied to the tool beam between the front and rear disks, and to limit the penetration of the rear disk by the use of a gauge wheel and to limit the penetration of the front disk by suitable connections with the tractor, whereby the tractor wheels serve as gauging means for the front disk. In this connection it is a still further feature to provide a plow of this type with moldboard openers, in which suitable means is provided for leveling the moldboard plow bottoms. A further feature is to provide an arrangement in which the front furrow opener, whether a disk or a moldboard plow bottom, or any other type of furrow opener, is connected with the tractor substantially midway between the front and rear wheels thereof and to permit the rear end of the tool beam, together with the associated rear furrow opener, to swing generally relative to the tractor. Also, it is a feature of this invention to provide a disk plow in which the draft connections are arranged so that there is an excess downward pressure at the front disk, over and above that required for penetration, such excess being loaded onto the front end of the tractor, thereby aiding steering. Further, it is a feature of this invention to provide a floating bail connected at its forward ends with the tractor at points below the point where the intermediate portion of the bail is connected with the tool beam, whereby there is a downward component of force on the tool beam by virtue of the downward inclination of the line of pull.

Still further, another feature of this invention is the provision of improved lifting connections for an integrally mounted two-bottom plow in which the rear furrow opener is raised out of the ground substantially at the same point thereon at which the front furrow opener was lifted.

Another important feature of the present invention is the provision of an integral plow with a sturdy guide wheel disposed laterally so as to run in the last previously opened furrow, with connections so that the guide wheel may, when necessary, be arranged to take some of the downward pressure at the front furrow opener and, moreover, serve actually to hold the tractor against tipping. Another feature of this invention is the provision of means for shifting the tool beam laterally relative to the tractor so as to compensate for creeping of the tractor on a hillside, or in other words, a lateral adjustment is provided to parallel the tool beam with the line of travel. In this connection, it is still another feature of the invention to provide means for adjusting the angle of each disk individually and to automatically retain the proper position of the disk scraper relative to the disk in any adjusted position thereof.

These and other objects and advantages of the present invention will be apparent to those skilled in the art after a consideration of the following detailed description, taken in conjunction with the accompanying drawings illustrating the preferred form of the invention.

In the drawings:

Figure 4A is a perspective view showing one form of attachment for the furrow openers;

Figure 5 is a plan view of a modified form of the present invention, using moldboard furrow openers instead of disks as shown in Figures 1 and 2;

Figure 6 is a side view of the implement shown in Figure 5;

Figure 7 is a fragmentary sectional view, taken generally along the line 7—7 of Figure 5, showing the means for leveling the tool beam when moldboard bottoms are used;

Figure 8 is a plan view of a modified form of disk plow embodying the principles of the present invention;

Figure 9 is a side view of the implement shown in Figure 8;

Figure 10 is a fragmentary sectional view taken along the line 10—10 of Figure 9;

Figure 10A is a view similar to Figure 10, showing the relative movement permitted between the guide wheel support and the guide wheel support bracket; and Figure 11 is a view taken along the line 11—11 of Figure 8.

Figure 1:
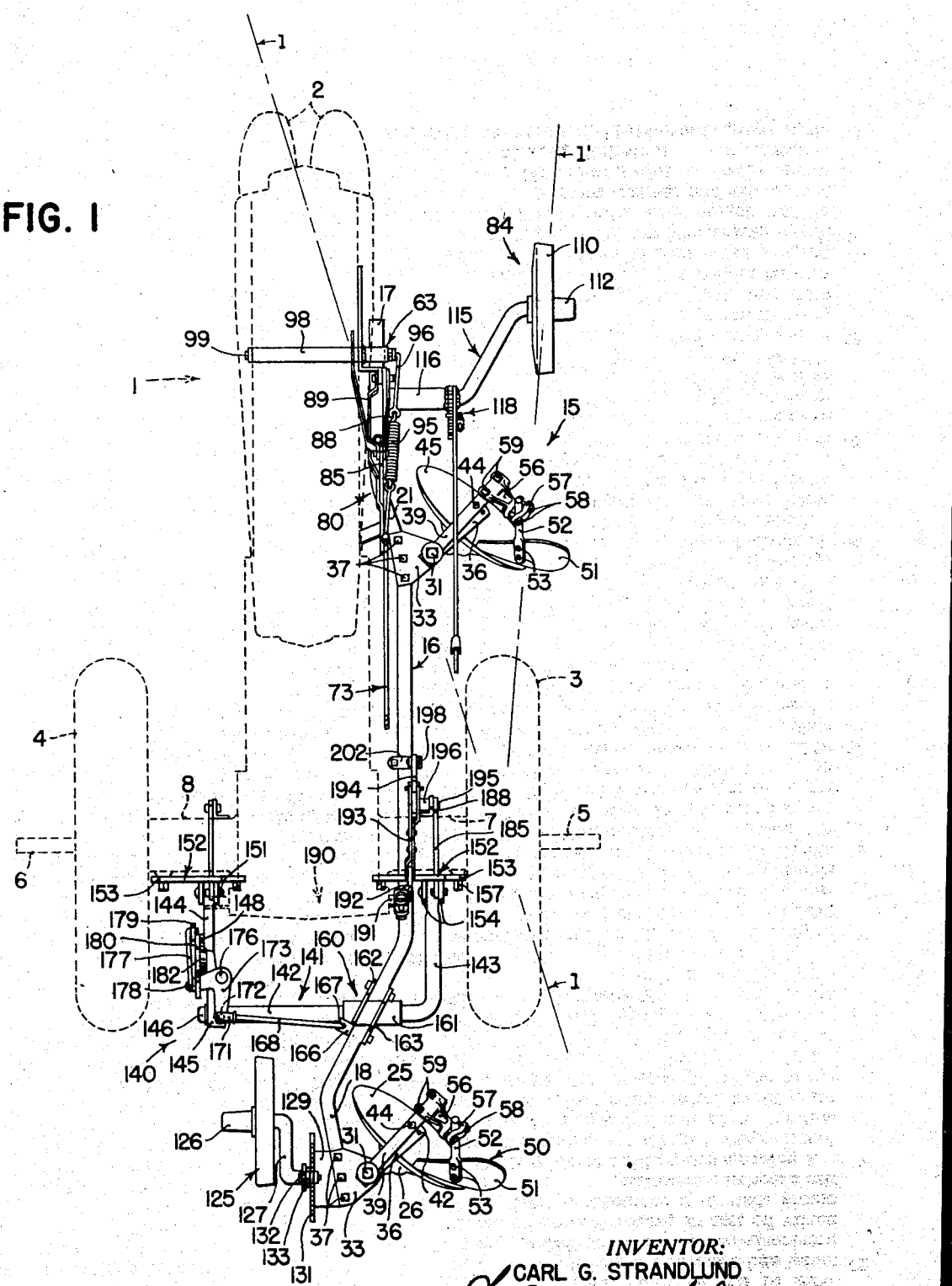
Figure 1 is a plan view of a disk plow in which the principles of the present invention have been incorporated.
Figure 2:
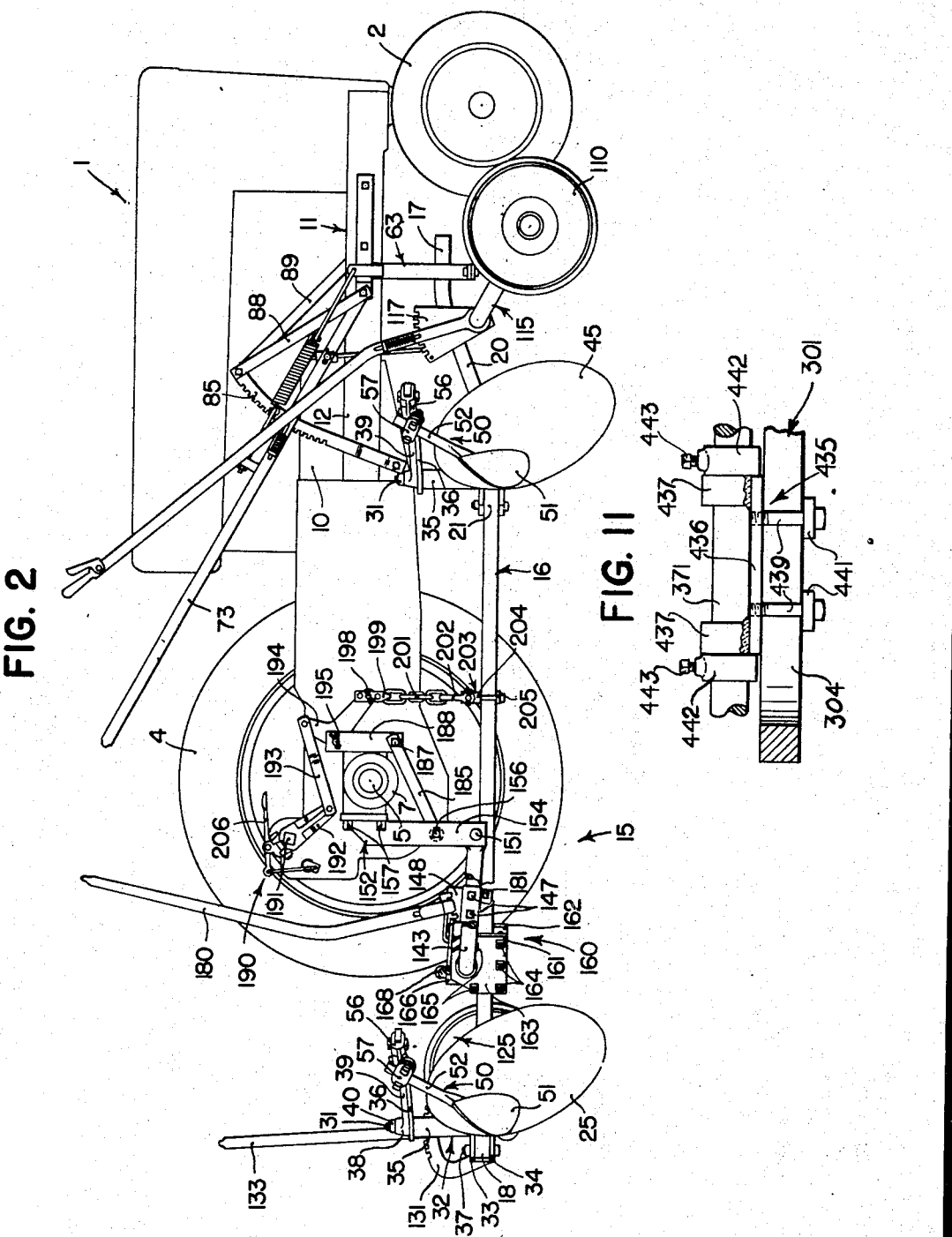
Figure 2 is a side view of the plow shown in Figure 1.
Figure 3:
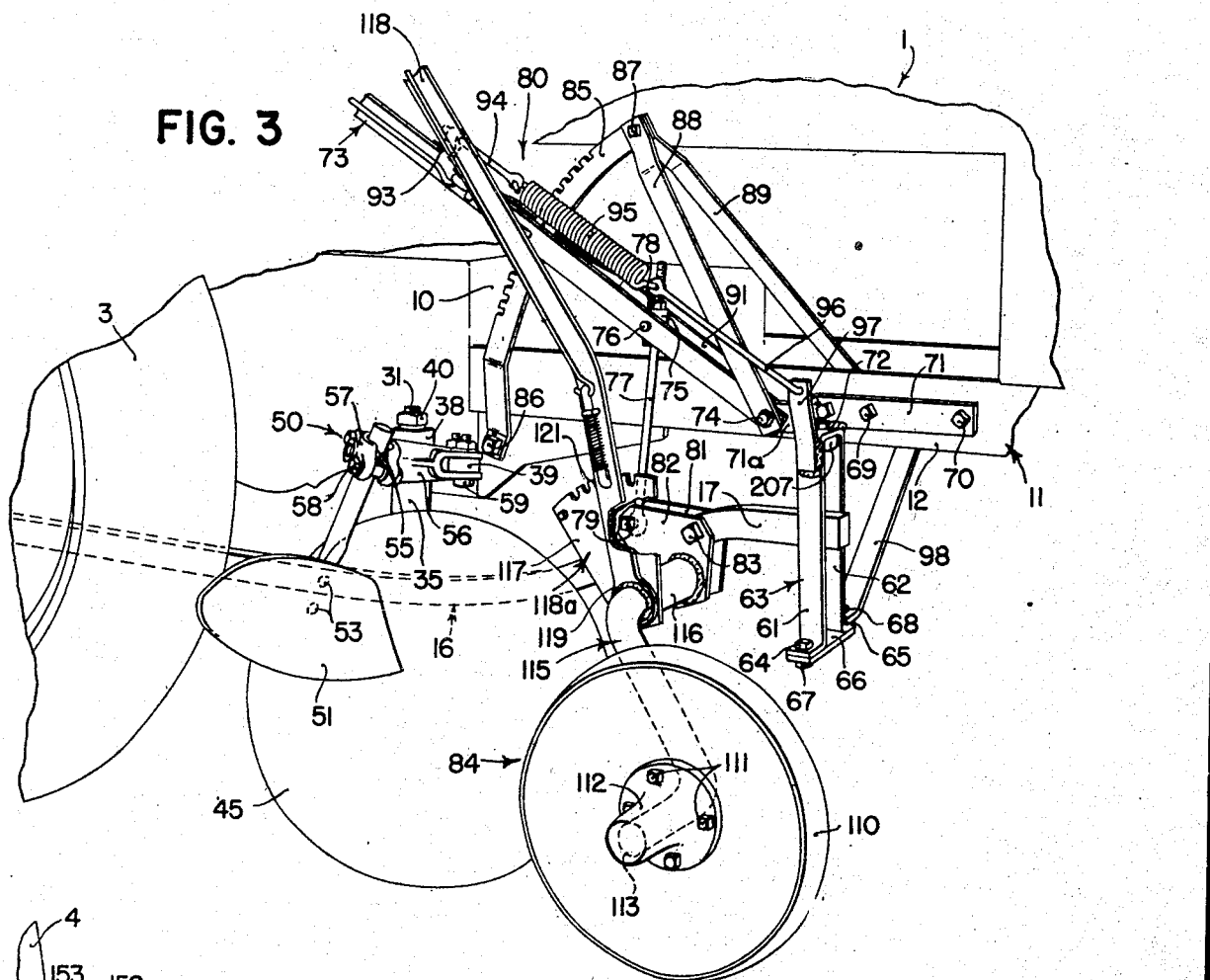
Figure 3 is a perspective view of the front end of the plow beam, showing in particular the connections between the front end of the plow beam and the tractor, also the front guide wheel.

Referring now more particularly to Figures 1 and 2, the tractor is indicated in its entirety by the reference numeral 1 and, in order to show the construction of the plow beam and associated parts, is shown in dotted lines in Figure 1. The tractor 1 is of the well-known tricycle type having front wheels 2 and rear wheels 3 and 4 secured, respectively, to axle shafts 5 and 6 mounted for rotation in extensions 7 and 8 of the tractor rear axle, indicated by the reference numeral 9. The tractor 1 also includes a source of power 10 mounted on or forming a part of the tractor frame 11, the latter including spaced apart side frame bars 12 (Figure 3).

The implement proper is indicated by the reference numeral 15 and includes a tool beam or main bar 16 having a generally longitudinally extending front end 17 and a rearwardly and laterally outwardly extending rear end 18, the intermediate portion of the bar 16 being bent substantially as shown in Figure 1. As best shown in Figure 2, the front end 17 is connected to the main body of the bar 16 by a downwardly and rearwardly inclined section 20. As best shown in Figure 1, the tool bar 16 extends between the rear wheels 3 and 4 and the front end of the bar lies well beyond the central portion of the tractor while the rear end extends rearwardly of the rear wheels 3 and 4. According to the present invention two furrow openers are fixed to the bar 16, the front opener being secured to a rearwardly and laterally outwardly directed section 21 of the bar 16 while the rear furrow opener is fixed to the laterally and rearwardly directed section 18, the sections 18 and 21 extending substantially in parallelism. Preferably, the furrow openers are in the form of disks, but they may be moldboard bottoms or any other suitable ground working tools if desired.

The rear furrow opener consists of a disk 25.

The latter is of conventional construction and is secured to a spindle member 26 which is journaled for rotation in a bearing member 27. The latter includes a shank 28 which, as best shown in Figure 4a, is provided with opposite cut-out sections 29, the edges of which are welded, as at 30, to the lower end of a standard 31 which is round in cross section. The standard 31 is rotatably received in a disk spindle bearing assembly 32, which includes upper and lower plates 33 and 34 which are apertured to receive and are welded to a tubular bearing member 35, the upper end of which is welded to a disk spindle adjusting arm 36. The plates 33 and 34 are spaced apart the vertical dimension of the rear end of the main bar 16 and are apertured, as is the rear end of the bar 16, to receive a pair of attaching bolts 37. The disk standard 31 is received within the tubular bearing portion 35 of the spindle assembly 32 and has its upper end projecting therefrom. This end is provided with a short taper square 31a upon which the square socket end 38 of a disk angling arm 39 is fixed, as by a nut 40. The arm 39 extends beyond the arm 36 to receive scraper supporting means which will be described below. The arm 36 is provided with a plurality of holes 42 and the arm 39 is provided with a single hole to receive a bolt 44. The latter may be inserted in any one of the several holes 42 in the arm 36 and so hold the disk 25 at the desired angle. If it should be necessary to change this angle, all that it is necessary to do is to remove the bolt 44 and insert it in one of the other holes 42 in the adjusting arm 36, whereby the angling arm 39 is fixed in its new position.

The front furrow opener is also a disk, indicated by the reference numeral 45, and the same is mounted onto the front section 21 of the tool beam or bar 16 by a spindle assembly and associated parts of the same construction as just described. Therefore, identical parts have been indicated by the same reference numerals.

Each of the disks 25 and 45 is provided with a scraper assembly 50. Each includes a blade 51 secured to a generally vertically disposed standard 52. The lower end of the latter is flattened and is secured, as by bolts 53, to the blade 51. Each standard or shank 52 is received within a pair of generally semi-spherical pivots 55 which are firmly held between a clamp arm 56 and a clamp cap 57, the latter being bolted to the arm 56, as shown at 58. The clamp arm 56 is secured by bolts 59 to the outer end of the disk angling arm 39 associated therewith. Hence, whenever the bolt 44 is removed and the disk given a new angle by shifting the arm 39 relative to the arm 36, the scraper 50 moves with the disk and no new adjustment of the latter is necessary. However, by virtue of the ball and socket mounting of the scraper standard 52 on the clamp arm 56, the scraper blade 51 may be secured in any necessary position, relative to the disk itself.

The plow beam 16 is connected with the tractor at both its forward and rear ends. At its front end the tool bar or beam 16 is mounted for vertical movement between the legs 61 and 62 of a frame bar guide indicated in its entirety by the reference numeral 63. The latter comprises a strap member formed with the legs 61 and 62 and with laterally outturned ends 64 and 65, which are apertured and receive a closure strap 66, the latter being secured to the ends 64 and 65 by bolts 67 and 68. A bracket section 71 is welded, as at 72, to the upper portion of the guide 63 and is bolted, as at 69 and 70, to the frame angle 12 of the tractor. The bracket 71 is extended rearwardly, as at 71a, and receives the pivot bolt 74 on which a depth adjusting lever 73 is mounted. The lever 73 forms a part of depth adjusting mechanism indicated in its entirety by the reference numeral 80. A short sleeve 75 is pivoted, as at 76, to the depth adjusting lever 73 and receives the upper end of a depth adjusting rod 77. The upper end of the latter is threaded and carries an adjusting nut 78 limiting the downward movement of the rod 77 in the pivot sleeve 75. The lower end of the depth adjusting rod 77 is provided with an eye which is connected by a pin 79 to two plates 81 and 82 which are bolted, as at 83, to opposite sides of the tool beam 16, as best shown in Figure 3. The plates 81 and 82 form a part of the guide wheel structure, indicated in its entirety by the reference numeral 84, which will be described below.

The depth adjusting lever 73, swinging about the pivot 74, moves along a sector or ratchet member 85, one end of which is bolted, as at 86, to the tractor and the other end of which is bolted, as at 87, to a pair of braces 88 and 89, the latter being bolted to the tractor at any suitable point while the link 88 is connected with the pivot 74. A hammer strap 91 forms a part of the depth adjusting lever 73 and at its lower end is pivoted on the bolt 74 and at its upper end carries a clip 93 to which the upper end of an adjusting bolt 94 is fixed, the lower end of the latter being connected by a spring 95 to a link 96, and at its lower end the latter is anchored to a clip 97 welded to the guide member 63. The latter is braced by a transverse brace 98, one end of which is secured to the guide 63 by the bolt 68 and the other end of which is secured by a bolt 99 to the tractor frame angle opposite the angle 12. The spring 95 serves to counterbalance the weight of the parts connected through the depth adjusting rod 77 to the lever 73.

A guide wheel 110 is bolted, as at 111, to a wheel bearing member 112 which is journaled on the lower outturned end 113 of a guide wheel crank axle 115, the upper laterally inwardly directed portion of which is received for rocking movement in a sleeve 116 which is passed through openings in and welded to the plates 81 and 82 that are bolted to the front end of the tool bar 16. The sleeve 116 extends laterally outwardly a substantial distance and at its outer end has welded thereto a sector 117 adjacent which an adjusting lever 118 moves. The lever 118 is welded, as at 119, to the guide wheel crank axle 115, and the lever 118 carries conventional detent mechanism 121 by which the lever may be latched to and unlatched from the sector 117. When unlatched, the lever 118 may be swung in one direction or the other to raise or lower the guide wheel 110. The crank axle 115 is held in place in the sleeve 116 by a quick detachable pin or the like.

A gauge wheel 125 is mounted at the rear of the tractor alongside the rear furrow opener. The rear gauge wheel is fixed to a bearing member 126, which may be identical with the bearing member 112 for the front guide wheel 110, and the bearing member 126 is mounted on the laterally outer end of a gauge wheel crank axle 127, the inner end of which is received in a sleeve 128 that is welded or otherwise fixed to a plate 129 that is bolted to the rear end 18 of the tool bar 16 by the same bolts 37 that secure the rear plates 33 and 34 of the rear spindle bearing assembly 32 to the tool bar 16. A sector 131 is welded to the plate 129 and is notched for cooperation with detent mechanism 132 which is carried by a gauge wheel adjusting lever 133. The latter is provided with an enlarged lower end which is pivoted on the gauge wheel crank axle 127 and above the lower end is apertured to receive a bolt 134 which is adapted to be inserted in any one of a plurality of holes 135 formed in a plate 136 that is fixed to the gauge wheel crank axle 127, as by welding or the like. Thus, by releasing the latch mechanism 132 and swinging the lever 133 in one direction or the other, the gauge wheel 125 for the rear furrow opener may be raised or lowered to provide for changing the depth of plowing. In a similar way, swinging the front depth adjusting lever 73 in one direction or the other raises or lowers the front end of the tool beam, and hence the front furrow opener, relative to the tractor, the wheels of which may be considered as serving as gauge wheels for the front furrow opener.

The tractor is connected with the tool beam 16 by draft and stabilizing connections indicated generally by the reference numeral 140. Such connections include, first, a bail pivoted to the tractor for swinging movement, and second, laterally shiftable means connecting the tool beam 16 to the bail. As a result of this construction, the rear end of the plow may rise and fall, by virtue of the swinging bail connection, yet receive full forward draft from the tractor at all times.

The bail member is indicated in its entirety by the reference numeral 141 and comprises a frame bail 142 having a forwardly extending leg 143, which normally extends forwardly and downwardly, as best shown in Figure 2, and a frame bail arm 144 which is secured to the frame bail 142 by means of a casting or bracket 145. The arm 144 extends generally in parallelism with the companion section 143. Preferably, the end of the frame bail 142 opposite the arm section 143 is squared to receive the bracket member 145, the latter having a square socket and secured to the frame bail 142 by a nut 146. The bracket 145 is secured to the bail arm 144 by means of a pair of bolts 147, which also secure a plate or bracket 148 to this portion of the bail. The plate 148 is extended to form a ratchet or sector for the landing lever of mechanism carried by the bail for shifting the rear end of the tool beam laterally, which will be described below. The forward ends of the two arm sections 143 and 144 of the bail 141 are pivotally connected, as by quick detachable pins 151, to the lower ends of a pair of bail hangers 152, each consisting of a hanger plate 153 and a pair of vertically disposed spaced apart straps 154 depending therefrom and welded thereto or otherwise secured at their upper ends to the associated hanger plate 153. A pin 155 and a bushing 156 is used to maintain the lower ends of each pair of hanger straps 154 in the desired spaced apart relation, which is designed to receive the forward ends of the bail arms 143 and 144. Studs are carried by the rear axle housings 7 and 8 and receive nuts 157 which securely fasten the bail hangers to the rear axle of the tractor.

The rear end 17 of the tool bar 16 is supported on the swinging portion of the bail 141, and is carried for lateral movement thereon, by means of a shiftable bracket indicated in its entirety by the reference numeral 160. The bracket 160 consists of a sleeve or pipe member 161 to which is welded or otherwise fixed a pair of hanger plates 162 and 163, spaced apart and depending from the sleeve 161. The plates 162 and 163 are adapted to receive the rear end 17 of the tool bar 16, and to this end are apertured to receive bolts 164 and 165 which pass, respectively, across the lower and upper sides of the bar 16, as best shown in Figure 2. The central bail section 142 is rockably received within and serves to support the sleeve 161. A small bracket 166 is welded to the laterally inner hanger plate 162 and is apertured to receive the downturned end 167 of a laterally shiftable cut adjusting rod 168. A cotter key or the like is passed through a hole in the downturned end 167 to hold the adjusting rod 168 connected with the shiftable bracket 160. The end of the rod 168 opposite the downturned end 167 is threaded and screwed into a sleeve 171, a lug 172 of which extends downwardly and is received in an opening in a horizontally swingable bell crank 173. The latter is pivotally mounted in a barrel section 175 that is formed on the bracket 145, the bell crank 173 having a pin 176 welded thereto and extending through the barrel section 175. A cotter pin or the like is passed through a hole in the lower end of the pin 176 to retain the bell crank 173 in position. A link 177 has a downturned end 178 inserted into an opening in one arm of the bell crank 173 and is extended forwardly and at its forward end is provided with a laterally inturned portion which is extended through a clip 179 fixed to a landing lever 180. The latter is pivoted on a bolt 181 that is carried at the lower portion of the sector 148, which is fixed to the bail arm 144 by the bolts 147, as described above. The lever 180 carries detent mechanism 182 which cooperates with the sector 148, to hold the lever in any position of adjustment. The bail hangers 152 are reenforced by a hanger brace 185 which is bolted at its rear end, as at 156, to the associated hanger bracket and at its forward end is connected, as by a bolt 187, to an angle bracket 188 bolted to the forward sides of the associated rear axle housing.

Suitable lifting mechanism is provided whereby the front disk is raised before the rear disk, the arrangement being such that in normal plowing gear, the rear disk is not raised until it reaches the point at which the front disk was raised. The tractor 1 is provided with a power lift unit indicated in its entirety by the reference numeral 190 and including a rock shaft 191 to which an arm 192 is fixed. The outer end of the arm 192 is connected by a link 193 to a lifting bell crank 194. The latter is pivoted, as at 195, to the upper end of the right-hand angle bracket 188, and to this end the latter is provided with a bell crank bearing sleeve 196 (Figure 1). The forward end of the bell crank 194 is apertured to receive a pin 198 which is inserted in any pair of a plurality of pairs of holes formed in a lifting chain clevis 199. A lifting chain 201 is connected at its upper end to the clevis 199 and at its lower end is connected by a clevis 202 to a tool beam bracket 203, the latter consisting of upper and lower strap members 204 and 205 connected together by bolts disposed on opposite sides of the tool bar 16, forwardly of the center of gravity of the tool beam and the furrow openers and associated parts. The tractor power lift unit 190 includes a pedal 206 or some other part by which the operation of the power lift unit 190 may be controlled. When the arm 192 swings rearwardly, the bell crank 194 exerts a pull through the chain 201 to raise the plow beam 16 and associated parts. Being connected forwardly of the center of gravity, the pull on the chain first raises the front end of the beam 16, which rises in the slotted guide 63 until the front end engages a bumper 207 (Figure 3). After this occurs, continued upward pull on the chain 201 causes the rear tool to be raised into its transport position. The chain 201 is slack in normal operation.

The operation of the implement is substantially as follows.

The tools are lowered into operating position by actuating the tractor power lift 190 to swing the arm 192 forwardly, the parts moving into the positions shown in Figure 2. From this figure it will be seen that as the tractor is driven forwardly the pull which is transmitted from the tractor to the implement through the bail 141 is exerted in the downward direction, so that there is a downward component of the draft exerted on the implement. This aids in forcing the disks 25 and 45 into the ground. The penetration of the disks is limited, the gauge wheel 125 at the rear end limiting the downward movement of the rear tool, the gauge wheel 125 running on the unplowed land. It will be noted that the draft pull is exerted on the tool beam 16 forward of the gauge wheel 125. In effect, therefore, the downward component of the draft pull acts to swing the tool beam 16 in a clockwise direction about the rear gauge wheel 125, thereby securing penetration of the front disk. In addition, the forward component of the draft pull, as exerted through the bail 141, also insures that the front disk will penetrate, since the center of soil pressure against it is below the horizontal component of the forward pull. The penetration of the front disk is, however, limited by the connections between the front end of the tool bar 16 and the lifting lever 73, which is adjustably fixed in position on the tractor, auxiliary adjustment being available by the nut 78. In effect, therefore, the tractor itself serves as a gauge wheel for the front disk, inasmuch as the penetration of the front disk is controlled by the position of the depth adjusting lever 73 on the tractor. Normally, the front end of the beam 16 is about in the central part of the slotted bracket 63, midway between the lower strap 66 and the upper bumper 207. As one result of this arrangement some of the downward component of the draft pull, which maintains operating depth at the front tool, is imposed through the link 77 and the lever 73 on the tractor forward of the drive wheels, and hence the loading on the front steering wheels 2 is increased. Not only does this tend to prevent the tractor from rising at the front end but, in addition, it enables the operator to steer the tractor at all times, inasmuch as the front wheels 2 bear firmly on the ground. If desired, the guide wheel 110, which runs in the last previously opened furrow, may be so adjusted, as shown in Figure 2, that it does not engage the bottom of the furrow but operates principally against the side wall of the furrow and is effective to keep the tractor from drifting landward away from the furrow. In this case, therefore, all of the available downward loading at the front disk is imposed onto the tractor to keep the front wheels firmly on the ground. However, by swinging the guide wheel adjusting lever 118 forwardly the guide wheel 110 may be lowered until it runs on the bottom of the furrow and relieves the tractor of some of the downward pressure. Thus, the operator is enabled to adjust the implement for the conditions encountered. In soft ground, therefore, where the residual downward pressure on the tractor may be considerable, the guide wheel 110 may be utilized to sustain a part, if not all, of this downward force. On the other hand, where the soil is dry and hard and the greater part of the downward component of the draft is required to keep the disks in the ground, the guide wheel 110 may be raised into a position out of contact with the bottom of the furrow, so that there is some additional loading, other than the static weight of the tractor, imposed on the front wheels. The front end 17 of the tool beam 16 is free to move upwardly in the guide 63. Hence, if the front disk 45 encounters an obstruction, it can roll over the same due to the upward movement permitted.

Since the front and rear tools 25 and 45 are disks, there is side thrust which must be taken care of. It will be seen from Figure 2 that the front and rear disks are arranged approximately equal distances in front of and in rear of the tractor rear axle. Therefore, the side thrust is imposed on the tractor substantially in line with the rear axle. This is where most of the weight of the tractor is borne, and hence this is the part of the tractor best adapted to sustain this side thrust. Moreover, being imposed substantially at a point in the transverse vertical plane of the rear axle, the steering of the tractor is unaffected by the presence of such side thrust. Moreover, if conditions should be such that the effective point of side thrust may vary fore and aft of the rear axle, the additional loading on the front wheels, mentioned above, enables the farmer to maintain an accurate steering at all times.

When operating on a hillside where the furrow is usually turned down hill, the guide wheel 110 serves a dual function, and is an important feature of this implement. As best shown in Figure 1, the guide wheel 110 is disposed laterally outwardly a considerable distance from the line *l* which extends from the front wheels 2 to the right-hand rear wheel 3, this being the line about which the tractor might tend to tilt, due to the slope of the hill and the downward pull of the furrow openers on the tractor, which are accumulative so far as the front furrow opener is concerned, since this is disposed to the right of the line *l*. When operating under conditions of this kind it is usually desirable to adjust the guide wheel 110 so that it runs along the bottom of the previously opened furrow, and thus takes a considerable part of the downward pressure at the front disk. However, if the slope of the hill should be steep enough that the tractor itself tends to tip laterally, the gauge wheel 110 and associated parts, which are of adequate strength to sustain the weight of the tractor, prevent the latter from tipping over. As will be clear from Figure 3, if the tractor should start to tip, the bumper 207 moves downwardly into engagement with the front end of the tool beam 16, after which the weight of the tractor is borne by the guide wheel 110, whereupon the line *l'*, connecting the guide wheel 110 and the righthand rear tractor wheel 3, becomes the axis about which the tractor tends to tip, and since the center of gravity of the tractor is well to the left of the line *l'*, the tractor is stabilized by the guide wheel under these conditions.

Another condition encountered when operating on hillsides is the tendency of the tractor to creep downhill, which must be compensated by steering the tractor uphill, which means that the longitudinal axis of the tractor is disposed at an angle to the actual line of travel. It is, of course, necessary to maintain the longitudinal axis of the plow in the same direction as the line of travel in order to secure a uniform width of cut. Therefore, according to the present invention, I have provided means for shifting the rear end of the tool beam laterally relative to the tractor in order to line up the plow with the line of travel. As will be clear from Figure 1, swinging the landing lever 180 in one direction or the other will act through the bell crank 173 and link 168 to shift the bracket 160 along the bail 141, thereby shifting the rear end of the tool beam and enabling the farmer to keep the same aligned with the line of travel. This arrangement also permits the farmer to vary the width of cut, as desired, either when operating on a hillside or operating on a level. Further, the disks may be individually adjusted by removing the bolt 44 and inserting it in one of the other holes formed in the arm 36. With the individual disk adjustment and the aligning adjustment just described, the implement of the present invention is a flexible outfit and may be adjusted to accommodate any condition that may be encountered.

Referring again to Figure 2, it will be seen that, in effect, the tool beam 16 is pivoted at its front end for generally vertical swinging movement about a generally transverse axis. That is, if the guide wheel 110 operates along the bottom of the furrow, the axis just mentioned is defined by the guide wheel itself. If the latter is adjusted to operate above the bottom of the furrow, then the axis is defined by the connections between the front end of the beam 16 and the tractor which permits such vertical movement. During such pivotal movement the bail 141 swings generally vertically relative to the tractor. This arrangement, in effect, provides a plow which can float relative to the tractor and has the important advantage that uniform plowing depth is maintained even though the tractor passes over ridges or across gullies, depressions and the like. Since the front tool is gauged from the tractor and is disposed substantially midway between the front and rear wheels of the tractor, as the latter crosses a depression the plowing depth at the front tool is substantially unaffected, except as the point between the tractor wheels is slightly lower than the points where the tractor wheels engage the ground. This difference is, however, immaterial. The rear tool is permitted to swing upwardly by virtue of the pivoted bail connection, whereby the plowing depth at the rear tool as determined by the rear gauge wheel 125 is maintained even though the plow as a whole is disposed at a considerable angle in a vertical direction relative to the tractor. As will be obvious, the plow accommodates the opposite condition, namely, passing over a ridge, in substantially the same way, except that the bail swings downwardly instead of upwardly. Mention was made above of the fact that by virtue of the swinging bail connection at the rear, the beam 16, in effect, swings about a transverse axis adjacent its forward end. However, it may also be considered that the tool beam swings about a transverse axis at the rear end thereof so far as securing adequate penetration of the front disk is concerned, such rear transverse axis being defined by the engagement of the rear gauge wheel 125 with the ground, in which case the draft transmitting bail is arranged, as best shown in Figure 2, so as to exert a downward component of force tending to swing the tool beam in a clockwise direction about the axis passing through the point of contact of the rear gauge wheel 125 with the ground.

To detach the plow from the tractor all that it is necessary to do is to remove the two pivot pins 151, which preferably are of the quick detachable type and disconnect either of the clevises 199 or 202. Next, the three bolts 37 fixing the forward disk unit to the front end of the beam will be removed and the disk, together with the scraper and angle adjusting arms, placed to one side out of the path of travel of the right-hand rear tractor wheel. Then either the upper or lower end of the depth adjusting rod 77 will be disconnected from the associated part, and lastly, the quick detachable pin at the laterally inner end of the crank axle 115 is removed, whereupon the guide wheel 110 and the lever 118 can be shifted outwardly and away from the path of travel of the right-hand rear tractor wheel. The tractor can then be driven forwardly over the front end of the beam 16, which then rests on the ground after it drops from the slotted bracket 63.

It is usually preferable before disconnecting the plow to swing the gauge wheel 125 down into contact with the ground so that the rear end of the plow will rest on the rear furrow opener and the rear gauge wheel 125 in upright position. This is to facilitate reattaching the implement to the tractor.

When connecting the plow to the tractor substantially the above described steps are repeated. First, the tractor is backed into position with the front end of the tool beam on the ground substantially directly underneath the slotted bracket 63. With one of the bolts 67, 68 removed and the other loosened, the bar 66 may be swung to one side and the beam 16 lifted into the space between the arms of the bracket 63. Then the bar 66 is fixed in position and the depth adjusting rod 77 attached to the beam. Next, the front disk and guide wheel are attached, and then the forward ends of the bail arms can be attached to the hanger brackets 152. This may be easily accomplished in this manner. Remembering that the rear end of the plow is resting on the rear disk and the rear gauge wheel 125, swinging the lever 133 serves to tilt the bail 141 laterally. The bail 141 may be raised and lowered bodily about its axis of connection at the bracket 160 by swinging the landing lever 180 but leaving it connected to the sector 148. Further, by unlatching the lever 180 from the sector 148 and swinging the lever, the bail itself may be shifted laterally in the bracket 160. Thus, even though the tractor is not in the exact position when it is driven into place, the bail 141 may be shifted laterally, tilted and/or swung vertically as desired in order to effect the proper connection at the pivots 151.

While, as described above, the principles of the present invention have been shown as incorporated in a disk plow, this invention is not to be limited to the use of disk type furrow openers, since moldboard plow bottoms or any other type of furrow openers may be used where desired. For example, in Figures 5 and 6 there is shown a plow constructed according to the principles of the present invention, using moldboard plow bottoms. Such modified form of the present invention will now be described.

The moldboard plow attachment is indicated in its entirety by the reference numeral 215 and includes a tool beam or main bar 216 having a front end 217 and a rear end 218 disposed generally in the same horizontal plane, with the intermediate portion of the bar, as at 219, being bent to clear the rear axle extension 7. Like the construction shown in Figures 1 to 4, the tool bar extends between the rear wheels 3 and 4 of a tractor, the front furrow opener being indicated at 225 and comprising a moldboard plow bottom fixed to a standard 226, the upper end of which is secured by a U-bolt 227 and an attaching casting 228 to the front end portion of the tool bar 216. As best shown in Figure 5, the front plow bottom 225 is disposed directly forward of the rear tractor wheel 3. The rear plow bottom is indicated by the reference numeral 231 and is connected to a standard, preferably identical with the standard 226 mentioned above, and the latter is secured to the rear end 218 of the beam 216 in the same way. Hence, the same reference numerals have been used.

The plow beam 216 is connected with the tractor at the front end of the beam 216 by means of a frame bar guide which is the same as the guide 63 described above, and therefore the same reference numerals have been used. A forwardly and laterally outwardly disposed bracket 235 is fixed to the front end portion of the beam 216 and receives a colter standard 236. The latter is fastened by a bolt 237 to the bracket 235 by a clamp casting 238 and the latter is fastened by a bolt 239 to one side of the bar 216. By loosening the bolt 237, the standard 236 may be rotated to a new position or shifted generally vertically, as desired. A yoke 241 is fixed to the lower bent end of the standard 236 and rotatably receives a rolling colter 242. The rolling colter 242 is disposed in the plane of the landside face of the front furrow opener 225. A rear colter is provided for the rear plow bottom 231, and preferably the rear colter is the same as the front colter. Therefore, the same reference numerals have been used.

Figure 4:
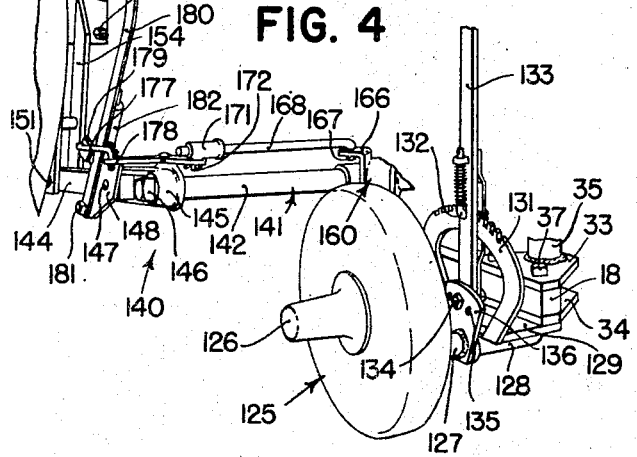
Figure 4 is a perspective view showing the rear end construction of the plow.
Figure 4:
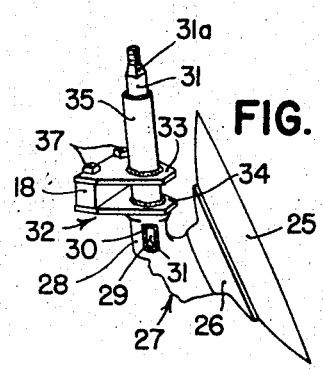

In Figures 5 and 6, the tractor 1 is provided with a pair of bail hangers, which may be identical with the bail hangers 152 described above. The bail hangers are adapted to pivotally receive the forward end portions of a bail member which preferably is identical with the bail member 141 described above. Hence, in Figures 5 to 7, these parts are indicated by the same reference numerals as in Figures 1 to 4. However, the means connecting the tool beam to the bail is slightly different. In this form of the invention, a sleeve 254 is slidably mounted on the central bail portion 142 and is adapted to be shifted laterally relative to the tractor by any suitable means, under the control of the operator on the tractor, such as the link 168, the hand lever 180, and associated part as shown in Figures 1, 2 and 4. However, in the form of the invention shown in Figures 5 to 7, the plow beam is not fixed directly to the sleeve 254, as is the arrangement shown in Figure 1 et al. but, instead, carries a pair of interconnected plates 257 connected together by a strap 255 and fixed, as by a set screw 256, to the rear end of the plow beam 216. The shiftable sleeve 254 lies between the lower part of the plates 257 and includes an apertured lug 258 through which a pivot bolt 259 carried by the plates 257 extends. To land the plow bottoms 225 and 231, an adjusting crank screw 263 is anchored, as by a pair of collars 264, to an extension 265 of the forward plate 255. The other end of the crank screw 263 threads into a nut member 267 carried between a pair of lugs 268 on the sleeve 254. Thus, by turning the crank screw 263 in one direction or the other, the tool beam 216 may be rocked laterally on the ball 141. In this form of the invention the link 168 may be connected to the shiftable sleeve 254 by a bracket 269 welded to the latter.

The rear gauge wheel for this form of plow is preferably identical to the gauge wheel unit shown in Figures 1 and 2 and described above. A plate 129a (Figure 5) is fixed to the rear end of the beam 216 by bolts 37a and receives the other parts of the gauge means which are for the sake of clarity indicated by the same reference numerals since such parts are identical. In Figure 6, portions of the gauge wheel unit are cut away to show other parts to better advantage.

The power lift arrangement in this form of the invention is substantially the same as has been described above, and hence further description is not necessary. In Figures 5 and 6, parts identical with those shown in Figures 1 and 2 are indicated by the same reference numerals.

The front end of the beam 216 carries a guide wheel with adjusting mechanism therefor, and the frame bar 216 is connected its forward end with depth adjusting mechanism, but since these mechanisms are preferably identical, respectively, with the guide wheel adjusting mechanism 118a and the depth adjusting mechanism 80 described above in connection with the first form of this invention, it is believed that further description is unnecessary. Due to the coulter bracket 235, it is preferable in Figures 5 to 7 to connect the plates 81 and 82 with the beam 216 forward of the guide bracket 63, rather than in rear of the same as in Figures 1 to 4.

The operation of this form of the present invention is substantially the same as the operation of the form shown in Figures 1 to 4 and need not be repeated. If it is desired, the moldboard bottoms 225 and 231 may be utilized without landsides, in which case the side thrust of one bottom is counterbalanced by the side thrust of the other bottom, both being sustained by the tractor, substantially at a point in the vertical transverse plane of the rear wheels. Also, this plow is adapted to conform to irregularities in the ground surface with the same effectiveness as the first described form. The plow beam 216 may be leveled so that the furrow openers 225 and 231 run in a level position by turning the crank 263 in one direction or the other. The chain 201 is connected to the beam 216 at a point just slightly forward of the center of gravity, whereby when the lifting mechanism is actuated, the front end of the beam 216 is first lifted and then, at about the same time that the rear bottom reaches the point on the ground where the front bottom was raised, the rear end of the beam is raised. Normally, the chain is slack.

In Figures 8 and 9 I have shown a modified form of disk plow, somewhat similar to but in certain respects more simple than the disk plow shown in Figures 1 to 4; and in that respect an improvement over the forms of the invention described above.

Referring now more particularly to Figures 8 and 9, the tractor is indicated in its entirety by the reference numeral 1a and is shown in dotted lines in order to illustrate the implement parts to better advantage. This form of disk plow, which is indicated in its entirety by the reference numeral 300, comprises a tool beam or main bar 301 of approximately the configuration of the beam or bar 16 described above in connection with Figure 1. The tool beam or bar 301, in the present instance, includes a substantially straight forward section 302, a substantially straight rear section 303 which passes underneath the rear axle housing 7a of the tractor, a laterally directed rear section 304, and a rearwardly directed rear section 305, the end of the latter terminating substantially in the center line of the tractor. The front section 302 of the tool bar 301 is joined to the section 303 that passes under the rear axle extension 7a by a rearwardly and laterally outwardly angled tool bar section 307. The forward portion of the latter section is provided with a pair of apertures, and the rear end of the rear section 305 is likewise apertured. A front furrow opener in the form of a disk 310 is mounted for rotation in any suitable manner at the lower end of a bearing standard 311 of conventional construction, to the lower end of which a bearing 312 is fixed, as by welding 313. The upper end of the disk standard 311 is suitable fixed, as by welding, to upper and lower plates 314 which are apertured to receive bolts 315 which are adapted to be inserted and fastened in place in the apertures in the forward portion of the tool beam section 307. The disk standard bracket plates are provided with one or more additional openings 316 (Figure 8) so that by removing the associated bolt 315 and shifting the bracket to a new position and inserting the bolt 315 in other openings, the angular position of the front disk 316 may be changed relative to the tool beam 301. The rear furrow opener is also in the form of a disk, and since the rear disk is identical with the front disk, the same reference numerals have been applied. The rear disk bracket may be adjusted relative to the tool beam 301 in the same manner as described above. Each disk 310 has a scraper 317 whose shank is fixed by an adjustable clamp 318 to the upper end of a curved scraper standard 319 which is fixed in any suitable way to the upper plates 314.

The front end 302 of the tool beam 301 is received between the side bars of a guide bracket, indicated in its entirety by the reference numeral 320. The guide 320 is similar to the guide 63 described above but differs therefrom in certain respects. However, like the guide 63, the guide bracket 320 includes inner and outer vertical bars 321 and 322 having laterally outturned lower ends to which is bolted a closure strap 323. Secured to the upper end of the bracket straps 321 and 322 is an attaching plate 324 which is bolted to the tractor, as at 325. The bracket straps 321 and 322 form, in effect, an inverted U-shaped member, the upper intermediate portion of which serves as a stop to limit the upward swinging movement of the front end 302 of the tool beam 301 and may be provided with a bumper at this point, if desired, as described above in connection with the first form of this invention, but preferably in this form of the invention the bumper takes the form of a roller 450 (Figure 9) mounted on a pin or bolt 449.

The lower end of the strap 321 is extended laterally and upwardly, as at 326, to form a brace which is connected to the opposite sides of the tractor. A cross brace 330 connects the upper ends of the parts 321 and 326. A bracket 327 is formed on or fixed to the guide bracket 320 and is apertured to receive a pivot 328 by which the forward end of a depth adjusting lever 329 is connected thereto. The latter includes detent mechanism 331 which cooperates with a sector 332 one end of which is fixed, as at 333, to the tractor and the other end of which is fixed to the upper end of a strap 335. The lower end of the latter is connected by the pivot 326 to the bracket 327. A link 342 extends vertically through a sleeve 343 which is pivoted, as at 344, to the adjusting lever 329, and the upper end of the link 342 is threaded and receives a pair of lock nuts 346. The lower end of the link is formed as a hook and engages in an aperture in a clip 347 which is secured by a U-bolt 348 to the forward portion of the tool beam 301. By releasing the detent mechanism 331 and moving the lever 329 to different positions, the front end of the tool beam 301 may be raised or lowered, as desired, thus adjusting the depth of operation of the front furrow opener 310.

A front guide wheel is connected to move generally vertically with the front end of the tool bar 301, much in the same manner as the guide wheel 110 described above, but in the instant modification, separate adjusting means for the guide wheel has been eliminated. In this form of the invention the guide wheel is indicated by the reference numeral 355 and is journaled for rotation on the laterally outer end of an axle 356. The laterally inner end of the latter is provided with a square taper and is received in the socket section 359 of a bracket casting 361. The latter member is provided with a longitudinal sleeve section 362 in which the forward end of the tool beam 301 is received. This end of the latter is provided with an aperture 363, and registering apertures are formed in the sleeve 362 to receive a bolt 365. The latter is smaller than one or more of the apertures just mentioned so that the sleeve casting is capable of limited rocking movement on the front end of the tool bar 301. However, such rocking movement is limited by virtue of the particular cross sectional configuration of the opening in the sleeve 362 through which the front end of the tool bar 301 extends. As best shown in Figure 10, this opening, which is indicated by the reference numeral 367, is generally of star section presenting four curved walls between which the square end of the tool bar 301 is received. As indicated in Figure 10A, after the sleeve 362 and guide wheel axle 356 associated therewith have rocked relative to the tool bar through a limited amount, further relative rocking movement in that direction is prevented. Preferably, the construction is such that during operation the wheel 355 serves to run along the previously formed furrow and serves as a guide or marker to assist the operator in maintaining uniform width of plowing. The relative movement permitted affords a certain freedom of action of the guide wheel 355 so that travel over irregular ground is accommodated. However, if the tractor should start to tip over, as is sometimes encountered in hillside work, the guide wheel 355 is available as an auxiliary support preventing overturning of the tractor, in substantially the same manner described above in connection with the form of the invention shown in Figures 1–4. The guide wheel and associated parts may be easily removed from the tool beam 301 merely by detaching the one bolt 365.

The rear end of the tool beam 301 is connected with the tractor by a bail indicated in its entirety by the reference numeral 370 and which is quite similar to the bail 141 described above. In this form of the invention the bail 370 includes an intermediate section 371 with which the tool beam 301 is connected, as will be described below, and a forwardly bent arm section 372, the forward end of which is flattened and apertured to receive a pivot pin 373 by which this portion of the bail 371 is pivotally connected to a vertically extending bail hanger 376. This member comprises a pair of straps 377 and 378 (Figure 8), and the upper ends of these straps are extended above the rear axle section 7a and is directed forwardly to form a power lift bracket 379. A brace 381 is bolted, as at 382 (Figure 9), in between the lower ends of the bracket straps 377 and 378 just above the pivot 373. The brace 381 is welded to a plate 385, and a similar plate 386 is welded to the forward edges of the bracket straps 377 and 378. These plates are fastened to the rear axle housing section 7a by any suitable means. The brace 381 extends forwardly and upwardly beyond the attaching plate 385 and is pivotally connected, as at 388, with the lower end of a hydraulic piston and cylinder unit indicated in its entirety by the reference numeral 389. The upper part of the hydraulic unit 389 is pivotally connected, as at 391, to the intermediate portion of a lifting link 392, the rear end of which is pivoted, as at 393, to the bracket 379 and the forward end of which is pivoted to a swivel 396. A lifting chain 397 is connected at its upper end to the swivel 396 and at its lower end to a bracket 398 which is secured by bolts 399 to the tool beam 301, preferably forwardly of the center of the tool beam. Fluid under pressure is supplied by any suitable means to the hydraulic unit 389 through a hose 401. Preferably, the source of fluid pressure is carried by the tractor.

The other arm of the bail 370 is formed as a separate part and takes the form of an arm 410, the forward end of which is pivoted, as at 411, in between the lower ends of a pair of straps 412 forming the left hand bail hanger 413. A brace 409 (Figure 8) connects the lower end of the hanger 413 with a plate 414 which is fixed to the forward side of the left hand axle housing. A sector 415 is secured to the bail arm 410, and the latter, which preferably is a forging, has a square socket 416 at its rear end to receive the square tapered end of the bail section 371, the latter being secured as by a nut 417 to the bail arm 410, whereby all of the bail parts are rigidly secured together. A sleeve member 420 is mounted on the intermediate bail section 371 adjacent the sector 415 and is formed with a transverse portion 421 in which the forward end of a gauge wheel crank axle 422 is fixed, as by a nut 423. The rear end of the gauge wheel crank axle is turned laterally inwardly and serves to rotatably receive the gauge wheel 425 which is held in place by any suitable means. As an integral part of the sleeve member 420, the latter carries an extension 427 to which the lower end of a gauge wheel adjusting lever 428 is fixed, the lever 428 carrying detent mechanism 429 which cooperates with notches in the sector 415. When the lever 428 is latched to the sector 415, the gauge wheel 425 swings vertically with the bail 370 about the transverse pivot axis which is defined by the pivot pins 373 and 411.

The rear transverse section 304 of the tool beam 301 is secured to the intermediate section 371 of the bail 370 by means of a hanger 435, which includes a plate 436 to which a pair of inverted U-shaped straps 437 are fixed, as by welding. The intermediate section 371 of the bail passes through the straps 437, and the plate 436 is rigidly secured to the intermediate section 304 of the tool beam 301 by bolts 439 and cross straps 441. A pair of collars 442 carrying set screws 443 are mounted on the intermediate bail section 371 on the laterally outer sides of the hanger yokes 437. By loosening the set screws 443 the collars and bail hanger may be shifted to different positions along the bail so as to determine the angular position of the tool beam 301 as a whole relative to the tractor, it being remembered that the front end of the tool beam is confined within the guide bracket 320.

The operation of the form of the invention shown in Figures 8-11 is substantially the same as the operation of the forms of the invention described above. The position of the front furrow opener 310 is gauged by the tractor through the depth adjusting connections 329 and 342, the chain 397 normally being slack so as to permit the rear end of the tool beam to swing up and down to accommodate irregularities in the ground surface. From Figure 9 it will be noted that the bail arms 372 and 410 extend generally downwardly and forwardly from the connection of the intermediate bail section 371 with the tool beam so that there is a downward component of the draft pull tending to insure proper penetration of the front disk 310, the penetration being limited by the depth adjusting lever 329 and lock nuts 346. The depth of penetration of the rear disk 310 is limited by the position of the gauge wheel 425 relative to the rear furrow opener or disk 310, the position of the gauge wheel 425 being adjusted by swinging the hand lever 428 in one direction or the other.

The implement is raised entirely off the ground by applying fluid pressure to the cylinder unit 389. Extension of the latter swings the arm 392 in a clockwise direction (Figure 9) about the pivot 393, which exerts an upward pull through the chain 397 against the tool bar or beam 301. The point of connection of the chain with the beam is so disposed that the front furrow opener is first raised, followed by the raising of the rear furrow opener. During the raising and lowering of the beam 301 relative to the tractor, the bail 370 swings about its pivot axis, and since the hand lever 428 latches the rearwardly extending gauge wheel crank axle 422 with the bail so as to form a rigid part thereof, it will be seen that the gauge wheel 425 moves through a greater extent of vertical movement than the adjacent rear furrow opener 310. In the construction illustrated, the gauge wheel moves vertically no less than twice the vertical displacement of the adjacent furrow opener. This construction has the advantage that the rear furrow opener is maintained at substantially constant depth of operation. If, for example, the rear furrow strikes a soft spot and tends to run deeper than desired, the corresponding downward movement of the rear portion of the beam 301 causes an accelerated downward movement of the rearwardly disposed gauge wheel 425, the extent of movement of the gauge wheel being greater than the corresponding movement of the rear disk. Thus, the gauge wheel is effective to prevent such downward displacement of the furrow opener. Likewise, if the rear disk should strike a hard spot and tend to rise, carrying with it the rear end of the tool beam 301, such upward movement of the latter acts to swing the gauge wheel 425 in a generally vertical direction faster than the rear disk, thereby lifting the gauge wheel 425 entirely off the ground which, in effect, adds to the rear end of the tool beam 301 the weight of the gauge wheel, thus additionally resisting the upward displacement of the rear furrow opener.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. An agricultural implement comprising means serving as a supporting frame, a generally longitudinally extending beam movably connected with said supporting frame means, a draft transmitting bail having its bight portion pivotally connected with the rear portion of said beam and its end portions pivotally connected with said supporting frame means at points generally below the bight portion of said bail, whereby there is a downward component effective against said beam, and tool means connected with said beam both forwardly and rearwardly of said bail.

2. An agricultural implement comprising means serving as a supporting frame, a tool beam connected at its forward end with said supporting frame means, tool means carried by said tool beam, the rear end of the latter being arranged for generally free vertical swinging movement in both directions relative to said supporting frame means, and draft transmitting means connected with said supporting frame means and the rear portion of said tool beam.

3. The combination with a tractor having ground engaging drive means, of a generally longitudinally extending tool beam, means connecting the latter with the tractor for generally vertical movement and movement about a transverse axis whereby to accommodate the passage of the tractor over uneven ground, and tool means connected with said tool beam both fore and aft of said transverse axis.

4. The combination with a tractor having ground engaging driving means, of a generally longitudinally extending tool beam, means movably connecting the latter with the tractor and including a generally horizontally disposed member pivoted to the tool beam and to the tractor whereby the tool beam is free to move either upwardly or downwardly relative to the tractor, said horizontally disposed member serving to transmit draft loads to the tool beam, tool means connected with said tool beam both fore and aft of said driving means and including front and rear furrow openers, means for gauging the depth of operation of the front furrow opener from the tractor, and a ground engaging gauge wheel for determining the operating depth of the rear furrow opener.

5. The combination with a tractor having ground engaging drive means, of a generally longitudinally extending tool beam, means connecting the latter intermediate its ends with the tractor for generally vertical swinging about a transverse axis, tool means connected with the front and rear end portions of said tool beam, and means reacting against the tractor for limiting the downward movement of the front end of said tool beam about said transverse axis.

6. The combination with a tractor, of an implement comprising a generally longitudinally extending tool beam, draft means connecting the latter with the tractor and including means whereby the tractor applies a forwardly and downwardly extending pull on the tool beam intermediate the ends thereof, ground engaging tool means connected with said beam fore and aft of said draft applying means, and means for limiting the movement of the tool beam relative to the tractor so as to hold said tool means at the desired depth.

7. The combination of a tractor having a rear axle and rear drive wheels, a generally longitudinally extending tool beam extending fore and aft of the drive wheels of the tractor, bail means swingably connecting the rear portion of said tool beam with the tractor, whereby said rear portion of the tool beam is capable of relatively free vertical movement relative to the tractor, ground engaging tool means secured to the forward portion of said tool beam, means connecting the forward end portion of said tool beam with the tractor at a point forward of the rear wheels whereby the tractor serves to determine the depth of operation of said forward tool means, rear tool means connected with the rear portion of said generally longitudinally extending beam, and gauge means connected with the latter for gauging the depth of operation of the rear tool means.

8. In an agricultural implement, the combination of a tractor having a rear axle and drive wheels therefor, a generally longitudinally extending tool beam extending both fore and aft of said rear axle and between the drive wheels of the tractor, tool means connected with said tool beam both fore and aft of said rear axle, and means whereby the side thrust of said tool means is taken by the tractor, said latter means including adjustable parts adapted to vary the angular position of said tool beam relative to the tractor in a generally horizontal plane, whereby to adjust the width of cut of said tool means.

9. A combination set forth in claim 8, further characterized by means connecting opposite end portions of said tool beam with the tractor and including mechanism for shifting one end portion of the tool beam generally laterally relative to the tractor.

10. In a plowing implement, means serving as a supporting frame, a generally longitudinally extending tool beam movably connected with the supporting frame means, a furrow opener secured to each end portion of said tool beam, stop means limiting the upward movement of the front end portion of said tool beam, and raising means connected with the generally central portion of said tool beam but forward of the center of gravity of said tool beam and furrow openers, whereby operation of said raising means first raises the front end of the tool beam and then raises the rear end after said stop means limits the upward movement of the front end.

11. In a plowing implement, means serving as a supporting frame, a generally longitudinally extending tool beam movably connected with the supporting frame means for both vertical and lateral swinging movement, a furrow opener secured to each end portion of said tool beam, and means for loading the side thrust due to said furrow openers onto said supporting frame means.

12. In combination, a tractor, a tool beam extending generally longitudinally thereof, means connecting one end of said tool beam with the tractor whereby said end of the tool beam may swing generally vertically about a transverse axis, means on the tractor at the other end of said tool beam serving to limit the movement thereof relative to the tractor, a plow fixed to said tool beam between the ends thereof, and a second plow fixed to the rear end of said tool beam.

13. In combination, a tractor, a tool beam extending generally longitudinally thereof, means connecting the forward end of said tool beam with the tractor for both longitudinal and generally vertical movement, a plow fixed to said tool beam adjacent the forward end thereof, a bail pivoted on the tractor adjacent the rear thereof and pivotally supporting the rear portion of said tool beam, and a second plow fixed to said tool beam rearwardly of said bail, swinging movement of the latter providing for the rear plow following undulations in the ground surface.

14. In combination, a tractor having rear wheels, a generally longitudinally extending tool beam, a slotted bracket carried by the tractor forward of the rear wheels and receiving the forward end of said tool beam, means associated with said bracket for limiting the vertical movement of the forward end of said tool beam in said slotted bracket, a plow fixed to said tool beam adjacent the forward end thereof, means movably connecting the rear end of said tool beam with the rear portion of the tractor, a second plow fixed to the rear end portion of said tool beam, and a guide wheel carried by the forward end of said tool beam.

15. A plow comprising the combination with a tractor having rear wheels of a generally longitudinally extending tool beam, a furrow opener secured to the front and rear end portions of said tool beam and disposed fore and aft, respectively, of the associated tractor wheel, means connecting said tool beam with the tractor whereby there is a component of the draft pull that serves to force said furrow openers into the ground, and means for controlling the depth of operation of said furrow openers including an adjusting lever pivotally mounted on the tractor and connected with the forward portion of said tool beam.

16. A plow comprising the combination with a tractor of a generally longitudinally extending tool beam, means connecting the latter with the tractor so as to impose on the latter lateral and vertical forces incident in the operation of the plow, a furrow opener connected with said tool beam, a guide wheel adjustably connected with said tool beam and disposed laterally relative to said furrow opener so as to run in the furrow opened on the previous round, and means for adjusting said guide wheel so as to run in said furrow but above the furrow bottom, whereby some of the vertical forces are imposed on the tractor, said guide wheel being also adjustable to a position in which at least some of said vertical forces are imposed on said guide wheel.

17. The combination with a tractor having front and rear wheels, a generally longitudinally extending tool bar, a pair of moldboard plow bottoms fixed to said tool beam both fore and aft of the adjacent rear wheel of the tractor, means connecting said tool beam with the tractor, and means for leveling said tool beam relative to the tractor so as to cause said plow bottoms to run level.

18. An agricultural implement adapted to be connected with a farm tractor and comprising a generally longitudinally extending tool beam, means connecting the front end of the latter to the tractor for generally vertical movement, a bail swingably connected with the rear portion of the tractor, means connecting said bail with the rear portion of said tool beam, a pair of moldboard furrow openers fixed to said tool beam fore and aft of the adjacent rear tractor wheel, and means reacting against said bail for changing the position of the tool beam to level said moldboard furrow openers.

19. In combination, a tractor, a bail pivotally connected to the tractor, a generally longitudinally extending tool beam connected at its forward end with the tractor and at its rear end with said bail, tool means connected with said beam, and means for shifting the rear end of the beam laterally along the bail and holding the rear end of the beam in any one of a plurality of laterally adjusted positions along said bail.

20. In combination, a tractor, a guide bracket secured to the forward portion of the tractor and serving as a vertically elongated slot, a bail pivoted to the rear portion of the tractor, a generally longitudinally extending tool beam having its forward end slidably disposed in the slot in said guide bracket, tool means connected with said beam rearwardly of said bail, means connecting the latter with said beam in draft transmitting relation, and means limiting the movement of the beam in said slot in one direction.

21. In combination, a tractor, a guide bracket secured to the forward portion of the tractor, a bail pivoted to the rear portion of the tractor, a generally longitudinally extending tool beam connected at its forward end with the tractor through said guide bracket, tool means connected with said beam rearwardly of said bail, a member carried by the bail and adapted to be shifted laterally relative thereto, and means fixing said member to said beam in draft transmitting relation.

22. An agricultural implement comprising supporting means, a tool beam disposed generally longitudinally thereof and connected therewith adjacent its forward end, a bail pivotally connected with said supporting means, means pivotally connecting the intermediate portion of said bail with the rear portion of said beam, tool means carried by the latter adjacent said bail, and ground engaging gauge means connected rigidly with said bail and disposed rearwardly thereof so that swinging movement of said bail raises and lowers said gauging means through a greater extent than the corresponding movement of said tool means.

23. In combination, a tractor of the stable type, an implement connected therewith at one side of the tractor for limited movement relative thereto in a generally vertical direction, and laterally outwardly extending ground engaging means connected with said implement and serving, after said relative movement reaches its limit, to prevent the tractor from tipping over toward said one side.

24. In combination, a tractor, a plowing implement connected therewith and including a generally longitudinally extending beam and furrow opening means secured thereto, a member mounted for rocking movement on said beam and extending laterally outwardly from said one side of the tractor, and ground engaging means carried at the laterally outer end of said member and adapted to prevent the tractor from tipping over toward said one side.

25. An agricultural implement comprising means serving as a supporting frame, a generally longitudinally extending beam separate from and movably connected with said supporting frame means, means on the latter connected with the generally intermediate portion of said beam for raising the latter relative to said supporting frame means, tool means connected with said beam both fore and aft of said raising means, and means at the front end portion of said beam for accommodating a limited amount of upward movement of the front end portion of said beam sufficient to raise the front tool means before the rear tool means is raised.

26. An agricultural implement comprising the combination with a tractor having a rear axle, of a generally longitudinally extending beam, means connecting the forward end of said beam with the tractor adjacent the forward portion of the latter, a bail serving to connect the rear portion of said beam with the tractor in draft transmitting relation and accommodating vertical movement of said beam relative to the tractor, bracket means carried by the rear axle of the tractor to which said bail is pivotally connected, and means reacting against said bracket means and connected with the intermediate portion of said beam for raising the latter relative to the tractor.

27. In a tractor mounted implement, a beam extending generally longitudinally of the tractor underneath the rear axle thereof, a bracket member secured to the rear axle at the rear side thereof, means connecting said beam with said bracket, the latter extending upwardly and forwardly relative to said rear axle, a second bracket secured to said rear axle at the front side thereof opposite said first mentioned bracket, a brace member extending underneath said rear axle and connecting said brackets, an arm pivotally connected with the upper and forwardly directed portion of said first bracket, means connecting the outer end of said arm with said beam, and lifting mechanism reacting against said brace and operatively connected with said arm for swinging the latter to raise said beam relative to the tractor.

28. An agricultural implement comprising means serving as a supporting frame, tool carrying means pivotally connected with said supporting frame means, a bail pivotally connecting the tool carrying means with said supporting frame means, and gauging means connected with said bail rigidly at a point spaced from the point of said first pivotal connection.

29. An agricultural implement comprising means serving as a supporting frame, tool carrying means, a bail pivotally connecting the latter with said supporting frame means for movement about an axis, a tool on said tool carrying means, and gauging means connected rigidly with said bail and extending in a direction away from said axis whereby a given movement of the tool carrying means causes a greater movement of the gauging means.

30. In an agricultural implement, a swingable member, a tool connected therewith, and gauging means including a part swingable about an axis and a ground engaging means secured to said part, said part being connected with said member at a point between said axis and said ground engaging means so that swinging movement of said member moves said ground engaging means farther than said tool.

31. The combination with a tractor, of a tool carrying member, means pivotally connecting the latter with the tractor, gauge means for said tool carrying member also connected with the tractor, and means connecting said gauge means with said member at such a point that movement of said tool carrying member serves to move said gauge means through a greater extent of movement than the adjacent part of said tool beam.

32. An agricultural implement comprising means serving as a supporting frame, a tool beam connected at its forward end with the tractor and extending rearwardly, a member pivoted at an intermediate point with the rear portion of said tool beam and having a part extending in one direction from said pivot point and a second part extending in another direction, a tool on the rear portion of said tool beam, a gauge wheel on one of said parts, and means connecting the other part with the tractor whereby a given extent of downward movement of the portion of said tool beam carrying said tool causes a greater extent of downward movement of said gauge wheel.

33. The combination with a tractor, of a tool carrying member connected at its forward end with the tractor, a tool at the rear portion of said member, a member swingably connected with said tool carrying member for movement relative thereto about an axis and including a part extending generally rearwardly from said axis and a part extending forwardly therefrom, a gauge wheel journaled on the rearwardly extending part, and means connecting the forwardly extending part with the tractor, whereby a downward movement of the tool carrying member through a given extent relative to the tractor causes a greater extent of movement of said gauge wheel.

34. The combination with a tractor having ground engaging drive means, of a generally longitudinally extending tool beam, tool means connected with said tool beam both fore and aft of said drive means and arranged whereby the latter takes substantially all of the side thrust of said tool means, and means connecting said tool beam with the tractor for lateral movement about a generally vertical axis and vertical movement about a generally transverse axis with respect to the tractor.

35. The combination with a tractor, of an implement comprising a generally longitudinally extending tool beam, draft means connecting the latter with the tractor, ground engaging tool means connected with said beam fore and aft of said draft applying means, said draft means being constructed so that the draft pull reacts against one of said tool means to force the other into the ground, means connected with one end portion of the tool beam to limit the downward movement of that end of the tool beam so as to hold the associated tool means at the desired depth, the other end portion of said tool beam being movable generally freely vertically relative to the tractor, and ground engaging gauge means at the other end portion of said tool beam for limiting the downward movement of that end of the tool beam.

36. An agricultural implement comprising means serving as a supporting frame, a generally longitudinally extending beam movably connected with said supporting frame means, a draft transmitting bail pivotally connecting the rear portion of said beam with said supporting frame means whereby the rear end of said beam is capable of relatively free vertical movement with respect to the supporting frame means, tool means connected with said beam both fore and aft of said bail, means on the supporting frame means for raising the front end of said beam relative to the rear end to adjust the depth of operation of said front tool means, and ground engaging means connected with the rear end portion of said tool beam for determining the depth of operation of said rear tool means.

37. An agricultural implement comprising means serving as a supporting frame, a generally longitudinally extending beam movably connected with said supporting frame means, a draft transmitting bail pivotally connecting the rear portion of said beam with said supporting frame means whereby the rear end of said beam is capable of relatively free vertical movement with respect to the supporting frame means, tool means connected with said beam both fore and aft of said bail, means on the supporting frame means for raising the front end of said beam relative to the rear end to adjust the depth of operation of said front tool means, and means for shifting the rear portion of said tool beam relative to said bail for determining the lateral position of the rear tool means with respect to said supporting frame means.

38. The combination of a tractor of the tricycle type having laterally spaced rear wheels and a central front wheel means, an implement connected with the tractor and including a ground wheel disposed laterally outwardly of a line connecting said front wheel means and the rear wheel at one side of the tractor, and means for limiting the extent of relative movement between the tractor and said wheel whereby the latter serves to prevent the tractor from tipping over toward said one side.

39. In combination, a tractor, a guide bracket secured to the forward portion of the tractor at one side thereof, a bail pivoted to the rear portion of the tractor and including a central section extending generally laterally of the tractor, a generally longitudinally extending tool beam connected at its forward end with the tractor through said guide bracket and extending along the tractor at said one side, the rear portion including a section extending laterally generally parallel to said central bail section and a second section extending generally rearwardly therefrom, means connecting said parallel sections, and tool means connected with said rearwardly extending tool beam section.

40. An implement comprising the combination with a tractor having a rear axle, of a generally longitudinally disposed tool beam extending underneath said rear axle, tool means therefor, and a draft transmitting member connecting the rear portion of said tool beam with the tractor and angled downwardly whereby there is a component of the draft pull that serves to force the tool means into the ground.

41. An implement comprising the combination with a tractor having a rear axle, of a generally longitudinally disposed tool beam extending underneath said rear axle, tool means therefor disposed both fore and aft of said rear axle, means connecting the front end of said beam with the tractor for relative movement in a generally longitudinal direction, and a draft transmitting member pivoted to the tractor and to the tool beam between said tool means in draft-transmitting relation and disposed at such an angle whereby there is a component of the draft pull that serves to force the tool means into the ground.

CARL G. STRANDLUND.